(12) United States Patent
Herzog

(10) Patent No.: US 6,348,635 B1
(45) Date of Patent: Feb. 19, 2002

(54) START-UP POLYMERIZATION PROCESS

(75) Inventor: Marc Herzog, Sausset les Pins (FR)

(73) Assignee: BP Chemicals, Limited, London (GB)

( * ) Notice: Subject to any disclaimer, the term of this patent is extended or adjusted under 35 U.S.C. 154(b) by 0 days.

(21) Appl. No.: 09/593,966

(22) Filed: Jun. 15, 2000

Related U.S. Application Data

(63) Continuation of application No. PCT/GB98/03738, filed on Dec. 14, 1998.

(30) Foreign Application Priority Data

Dec. 16, 1997 (FR) .............................. 97 16210

(51) Int. Cl.⁷ .............................. C07C 2/04; C08F 2/34
(52) U.S. Cl. ................. 585/502; 585/951; 585/510; 585/520; 585/530; 526/59; 526/61; 526/104; 526/901; 526/922
(58) Field of Search ................. 585/502, 510, 585/520, 530, 951; 526/59, 61, 104, 901, 922

(56) References Cited

U.S. PATENT DOCUMENTS

| | | | |
|---|---|---|---|
| 5,075,395 A | 12/1991 | Durand et al. | 526/105 |
| 5,077,358 A | 12/1991 | Durand et al. | 526/125 |
| 5,627,242 A | 5/1997 | Jacobsen et al. | 526/60 |
| 5,830,955 A | 11/1998 | Takeda et al. | 526/60 |
| 5,844,054 A | 12/1998 | Samples et al. | 526/60 |

FOREIGN PATENT DOCUMENTS

| | | |
|---|---|---|
| EP | 0 658 570 A2 | 6/1995 |
| JP | 7-165820 A | 6/1995 |
| WO | WO-97/25355 A1 | 7/1997 |

OTHER PUBLICATIONS

AN 95–041314, "Operation of Olefin–Vapour Phase Polymeriser —by Supplying Solid Catalyst Based on Titanium and/or Vanadium and Magnesium, and Organo–Aluminium Cpd", Derwent Publications Ltd., London, GB, XP–002073029, Abstract of JP 06 322027, (1994).

Primary Examiner—Walter D. Griffin
(74) Attorney, Agent, or Firm—Finnegan, Henderson, Farabow, Garrett & Dunner, L.L.P.

(57) ABSTRACT

A process for starting up a reaction for the polymerization of an olefin in the gas phase carried out using a catalyst based on chromium oxide in a fluidized bed reactor through which moves a reaction gas mixture containing the olefin, wherein in the start-up of the reaction, the olefin is introduced into the reactor until the desired production of polymer is reached by means of a two-stage process, during the first stage of which the introduction of the olefin is carried out so as to maintain a constant partial pressure of olefin in the reactor and during the second stage, the introduction of olefin is regulated at a constant flow rate.

11 Claims, 1 Drawing Sheet

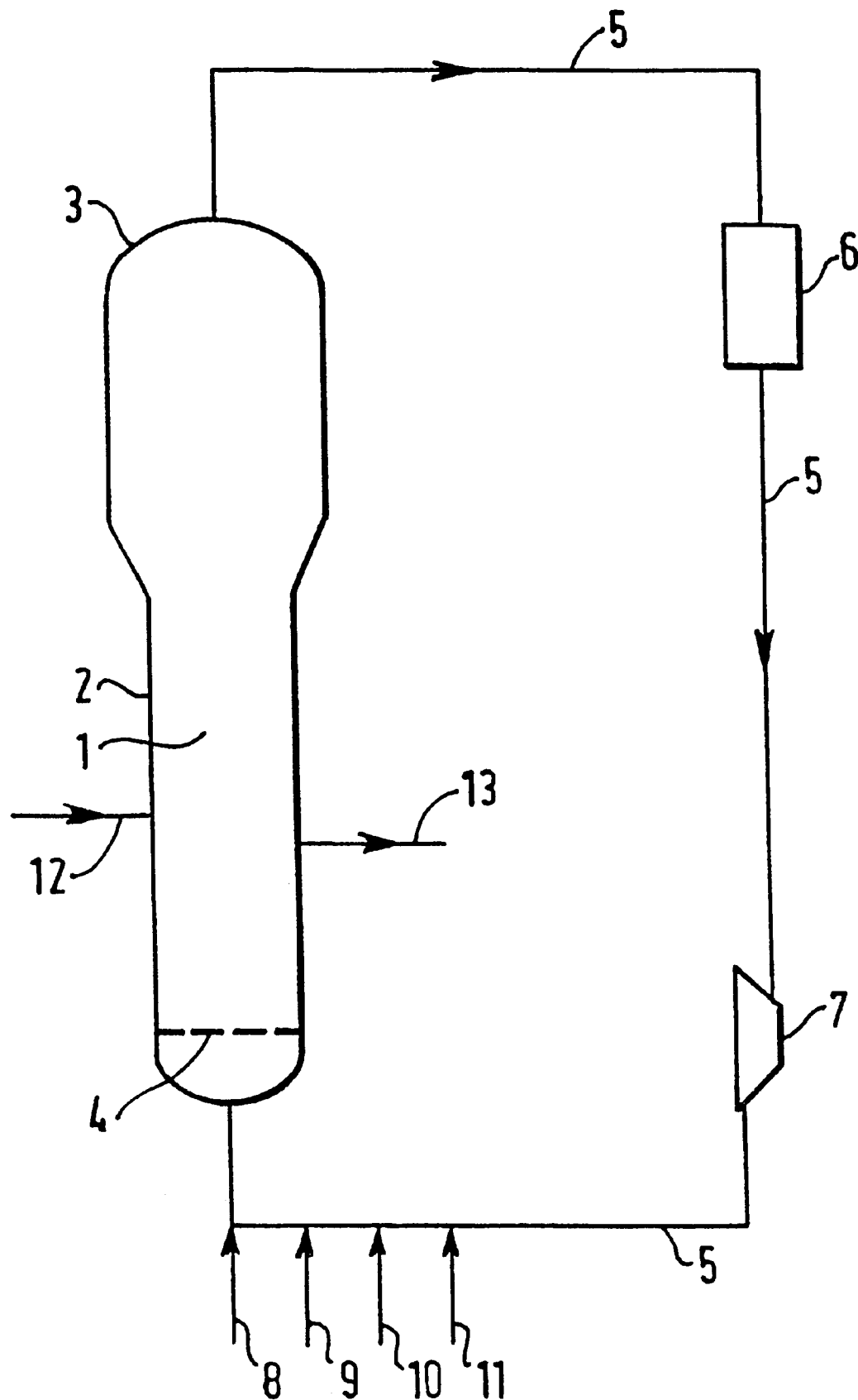

START-UP POLYMERIZATION PROCESS

This application is a continuation of international application number PCT/GB98/03738, filed Dec. 14, 1998, the content of which is incorporated herein by reference.

BACKGROUND OF THE INVENTION

The present invention relates to a process for starting up a reaction for the polymerization of an olefin in the gas phase carried out in a fluidized bed reactor using a catalyst based on chromium oxide.

When starting up a reaction for the polymerization of an olefin in the gas phase employing a catalyst based on chromium oxide, formation of agglomerates and/or of fine particles of polymer is regularly observed. Furthermore, it may also happen that polymer having an undesirable quality is produced, for example by formation of a polymer having an undesired melt flow index. These phenomena appear in particular after having begun to introduce the catalyst into the fluidized bed and up to the time when a certain amount of polymer is produced, in particular up to the time when a stable level of production of polymer is reached, that is to say the desired maximum level of production.

It has also been observed that, during the start-up period, the instability of the polymerization conditions often results in uncontrolled reactions and the formation of agglomerates and/or of fine particles of polymer.

A novel process for starting up a reaction for the polymerization of an olefin in the gas phase carried out in a fluidized bed reactor has now been found which makes it possible to solve the abovementioned problems. More particularly, the process of the invention makes it possible to start up a polymerization reaction with very limited, indeed zero, formation of agglomerates. Furthermore, it is also the case that no formation of fine particles of polymer is observed.

SUMMARY OF THE INVENTION

According to the present invention there is provided a process for starting up a reaction for the polymerization of an olefin in the gas phase carried out using a catalyst based on chromium oxide in a fluidized bed reactor through which moves a reaction gas mixture containing the olefin, characterized in that in the start-up of the reaction the olefin is introduced into the reactor until the desired production of polymer is reached by means of a two-stage process, during the first stage of which the introduction of the olefin is carried out so as to maintain a constant partial pressure of olefin in the reactor and during the second stage, the introduction of olefin is regulated at a constant flow rate.

BRIEF DESCRIPTION OF THE DRAWINGS

The detailed features and advantages of the invention will now be explained in connection with the accompanying drawing which is diagrammatic view of a fluidized-bed, gas-phase polymerization reactor.

DETAILED DESCRIPTION OF THE INVENTION

With respect to the present invention, the period for starting up the reaction is the period which passes between the time at which the introduction of the catalyst into the reactor is begun and the time at which the desired production of polymer is reached. This means that the start-up period is a period during which the production of polymer is increased until a maximum level of production is obtained. Consequently, the start-up period is immediately followed by a production period during which the aim is to maintain a constant or substantially constant production of polymer. The start-up period can advantageously be preceded by one or more purification periods during which the reactor is freed as far as possible from impurities, such as oxygen or water, which poison the catalyst. The purification of the reactor can be carried out as indicated in European Patent Application EP-A-0180420.

The duration of the start-up period varies with the size of the fluidized bed reactor. It also depends on the quality of the starting materials employed, in particular on the purity of the olefin. With industrial-scale reactors, it can last in total between 1 hour and 48 hours, preferably between 5 and 35 hours.

During the start-up period, the production of polymer is thus increased. To do this, the flow rate for introduction of olefin into the reactor is increased according to a two-stage process.

The first stage begins at the time when introduction of the catalyst into the reactor is begun. In general, the reaction is observed to begin from the introduction of catalyst. However, the reaction may be observed to begin some time later. In practice, the reaction is found to begin by an increase in the temperature of the reaction gas mixture exiting from the fluidized bed.

During the first stage, the olefin is introduced into the reactor so as to keep the partial pressure of olefin constant. This means that the aim is to keep the partial pressure of olefin at a given value, in particular using pressure regulation. However, in particular at the time when the polymerization reaction is observed to begin, a slight fall in the partial pressure of the olefin may be observed. During the first stage, the partial pressure of olefin must be sufficient to observe that the reaction has begun and subsequently to prevent the reaction from stopping. Generally, the olefin represents at least 10% and preferably at least 15% by volume of the reaction gas mixture, so as to have a partial pressure of olefin greater than or equal to 0.1, preferably greater than or equal to 0.2 MPa. In practice, the aim is generally to maintain the partial pressure which has been set prior to the start-up period. This first stage is as short as possible. It can nevertheless last between 10 minutes and 3 hours, preferably between 1 and 2 hours, depending on the size of the reactor. This stage is generally complete when the production rate of polymer has reached a sufficient value which generally corresponds to between 5 and 30%, preferably between 10 and 20%, of the production desired for the production period which follows the start-up.

At the end of the first stage, the method of introducing the olefin into the reactor is modified. More specifically, the pressure may be regulated which makes it possible to introduce the olefin into the reactor throughout the second stage at a constant flow rate. The partial pressure of olefin can then undergo variations and is not regulated. However, the partial pressure of the olefin does not exceed a maximum value set in advance, in order to avoid an excessively high rate of polymerization.

During the second stage, the flow rate for introduction of the olefin into the reactor is gradually increased, continuously or, preferably, sequentially. In practice, the olefin flow rate is increased during this second stage by successive stationary phases, the set value of the flow rate for introduction of olefin being steadily modified. In general, during this stage, between 5 and 40 stationary phases are implemented. A stationary phase generally lasts between 30 and 90 minutes. The total duration of the second stage is between 5 and 40 hours, preferably between 10 and 30 hours. The second stage ends when the production of polymer is equal to the desired value for the production period.

At the beginning of the start-up period, the fluidized bed can contain essentially charging powder, that is to say inactive polymer powder which originates from a previous reaction. The initial height of the bed is generally low. It can represent from 30 to 60% of the desired final height at the end of the start-up period. However, the height of the initial bed can already be at its final maximum height. Polymer is generally withdrawn as soon as the fluidized bed is at its maximum height.

The fluidization rate can be constant throughout the start-up period. However, it can also increase slightly throughout or during part of the start-up period. In particular, it can increase as a function of the height of the fluidized bed. For example, the initial fluidization rate can range from 40 to 45 cm/s; the final fluidization rate can range from 45 to 55 cm/s.

The composition of the reaction gas mixture which passes through the fluidized bed is advantageously set-prior to the start-up period. It is then preferably deliberately kept constant or substantially constant during the first stage. Subsequently, it can substantially change during the second stage of the process of the invention. The gas mixture contains the olefin which can have, for example, from 2 to 10 carbon atoms, such as ethylene, propylene, 1-butene, 1-hexene or 4-methyl-1-pentene. It can also contain an inert gas, such as nitrogen or a saturated hydrocarbon, hydrogen and optionally one or more comonomers. The comonomer is generally a second olefin. The process is generally used to start up a reaction for the polymerization of ethylene with optionally another olefin having from 3 to 10 carbon atoms, such as propylene, 1-butene, 1-hexene or 4-methyl-1-pentene.

At the beginning of the start-up period, the reaction temperature can usually range from 80 to 100° C. It can be kept constant throughout the start-up period or can substantially increase. The final temperature at the end of the start-up period can range from 90 to 115° C., depending on the quality of the polymer manufactured.

Throughout the start-up period, the total pressure of the gas mixture which moves through the reactor must be sufficient to be able to ensure the fluidization of the polymer particles in the course of formation constituting the fluidized bed. It must not be excessively high in order to avoid entrainment of particles, in particular of catalyst particles, outside the fluidized bed. The entrainment of particles is to be avoided in particular during the first stage of the start-up period. The final total pressure can be between 0.5 and 5 MPa, preferably 1.5 and 2.5 MPa.

The introduction of catalyst into the reactor is carried out continuously or sequentially. Throughout the start-up period, the throughput for introduction of catalyst is increased, preferably in parallel with the increase in production of polymer. More specifically, during the first stage of the process, the catalyst is advantageously introduced with a constant throughput. During this stage, a decrease in the content of chromium in the polymer produced may be observed. An increase followed by a decrease in the content of chromium may also be observed. At the end of this first stage, the content of chromium in the polymer produced must not be excessively high. It is preferably equal to or slightly greater than the content of chromium desired for the production period. The latter can range from 1 to 10 ppm, preferably between 2 and 6 ppm.

During the second stage, it is desired to produce a polymer having a constant content of chromium, in particular equal to or substantially equal to that desired for the production period. Generally, when the first stage of the process is fairly fast, it is equal to that obtained at the end of the first stage. To achieve this, the throughput for introduction of catalyst into the reactor is advantageously increased in parallel with each increase in the flow rate for introduction of olefin. For this reason, the ratio of the throughput for introduction of catalyst to the flow rate for introduction of the olefin is kept constant throughout the second stage. In this way, the polymer produced during the start-up period has a constant quality, in particular a constant melt flow index.

With a view to increasing the yield of the catalyst, it is advantageous to introduce into the reactor, in addition to the catalyst, an organometallic compound of a metal from groups I to III of the Periodic Classification of the Elements, such as, for example, an organoaluminium compound. This compound is used in particular to purify the reaction gas mixture.

The production per unit volume of polymer, that is to say the amount of polymer produced per hour and per $m^3$ of fluidized bed, is relatively low throughout the first stage, generally less than 20 $kg/m^3/h$. It increases throughout the second stage to reach approximately from 100 to 200 $kg/m^3/h$ at the end of the start-up and in the production period.

The increase in production per unit volume of polymer must not be excessively high during the first stage. In general, it is maintained at a value of less than 10, preferably of less than 5, $kg/m^3/h/h$. During the second stage, this variation is preferably kept constant, in principle at a value of between 3 and 20 $kg/m^3/h/h$ for industrial-scale reactors.

The introduction of an optional comonomer into the reactor can be carried out during the start-up period. However, it is preferable to introduce the comonomer when the polymerization reaction is stabilised, in particular at the end or following the start-up period. The introduction of the comonomer is preferably carried out so that the ratio of the flow rate of ethylene to the flow rate of comonomer is constant, in particular with a constant flow rate.

The chromium-based catalyst is a catalyst comprising a refractory oxide compound which is activated by a heat treatment advantageously carried out at a temperature of at least 250° C. and at most equal to the temperature at which the granular support begins to sinter and under a non-reducing atmosphere and preferably an oxidizing atmosphere. This catalyst can be obtained by a great number of known processes, in particular by those according to which, in a first stage, a chromium compound, such as a chromium oxide, generally of formula $CrO_3$, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides. In a second stage, the chromium compound thus combined with the granular support is subjected to a so-called activation operation by heat treatment at a temperature of at least 250° C. and at most at which the granular support begins to sinter. The temperature of the heat treatment is generally between 250° C. and 1200° C. and preferably between 350 and 1000° C.

The catalyst can contain from 0.05 to 5%, preferably from 0.1 to 2%, by weight of chromium.

The catalyst can contain, in addition to the chromium, from 1 to 10% of titanium in the form of titanium oxide and/or fluorine and/or aluminum, in particular in the form of aluminums oxide.

The catalyst can be used as is or optionally in the form of a prepolymer containing, for example, from $10^{-5}$ to 3, preferably from $10^{-3}$ to $10^{-1}$, millimole of chromium per gram of polymer. The process of the invention is particularly suited to the use of a non-prepolymerized catalyst.

The polymerization is carried out continuously in a fluidized bed reactor according to techniques known in themselves and in equipment such as that described in French Patent No. 2,207,145 or French Patent No. 2,335,526. The process of the invention is particularly well suited to industrial-scale reactors of very large size. The reaction gas mixture containing the olefin and the alpha-olefins to be polymerized is generally cooled by means of at least one heat exchanger arranged outside the reactor before being recycled using a recycling pipe. Following the start-up period, the polymerization reaction is advantageously carried out as indicated in French Patent No. 2,666,338.

The polymer produced in the production period at the end of the start-up period can equally well be a homopolymer of the olefin or a copolymer of the olefin with an alpha-olefin. It can have a relative density ranging from 0.925 to 0.965, a melt flow index $MI_{2.16}$, measured under 2.16 kg and at a temperature of 190° C., ranging from 0.01 to 1 g per 10 minutes, a molecular mass distribution, measured by the $M_w/M_n$ ratio, ranging from 5 to 25, preferably from 8 to 15, a content of chromium ranging from 0.5 to 5 ppm, preferably from 1 to 4 ppm, and a content of comonomer ranging from 0 to 10% by weight.

The accompany drawing diagrammatically represents a fluidized-bed, gas-phase, polymerization reactor (1) composed essentially of a vertical cylinder (2) surmounted by a disengagement vessel (3) equipped in its lower part with a fluidization grid (4) and of a recycling pipe (5) connecting the top of the disengagement vessel to the lower part of the reactor situated under the fluidization grid, which is equipped with a heat exchanger (6), a compressor (7) and feed pipes for ethylene (8), for comonomer (9), for hydrogen (10) and for nitrogen (11). The reactor is also equipped with a feed pipe for catalyst (12) and with a pipe for withdrawing polymer (13).

Method for Measuring the Molecular Mass Distribution

In the present invention, the molecular mass distribution of the polyethylenes is calculated by the ratio of the weight-average molecular mass, $M_w$, to the number-average molecular mass, $M_n$, from a curve obtained by a Waters 150 CV®G.P.C. device equipped with refractometric detection and with a set of three 25-cm Shodex AT 80/MS columns arranged in series. The operating conditions are as follows:

solvent: 1, 2, 4-trichlorobenzene (T.C.B.)
flow rate: 1 ml per minute
temperature: 145° C.
concentration of the sample analysed: 0.05% by weight
injection volume: 250 μl
refractometric detection
calibration by a polyethylene sold by BP Chemicals S.N.C. (France) having a distribution of 17.5 and a molecular mass $M_w$ of 210,000.

The following example illustrates the present invention.

EXAMPLE

The operation is carried out in a fluidized bed reactor, such as represented diagrammatically in the accompany drawing, composed of a vertical cylinder with a diameter of 3 m and a height of 10 m. This reactor was purified beforehand, so as to have less than 1 vpm of water in the reaction gas mixture employed, according to the method described in Example 1 of European Patent Application EP-A-0180420.

The reactor initially contains a fluidized bed with a height of 4 m composed of a polymer originating from a previous reaction and having a relative density of 0.958, a melt flow index $MI_{2.16}$, measured under 2.16 kg and at a temperature of 190° C., of 0.2 g per 10 minutes, a molecular mass distribution of 12, a content of chromium of 4 ppm and a content of 1-butene of less than 0.5% by weight.

The reaction gas mixture passing through the fluidized bed initially contains, by volume, 62% of nitrogen, 20% of ethylene and 18% of hydrogen. The initial total pressure of this mixture is 1.7 MPa and the fluidization rate is 40 cm/s. The temperature of the polymerization reaction is then 92° C.

Use is made of a non-prepolymerized catalyst, prepared by subjecting an inactive catalytic solid sold under the trade name "EP 307" by Joseph Crosfield and Sons (Warrington, Great Britain) to a heat treatment for 5 hours at 550° C. The catalyst contains, by weight, 1% of chromium in the form of chromium oxide of formula $CrO_3$ and 3.8% of titanium in the form of $TiO_2$, in combination with a granular silica support.

The reaction is started up by a two-stage process. During a first stage, the catalyst is introduced into the reactor with a throughput of 450 g/h. Furthermore, ethylene is introduced so as to keep the composition of the reaction gas mixture constant and equal to the initial composition. After 2 hours, the total pressure is 1.8 MPa, the fluidization rate is still 40 cm/s and the height of the fluidized bed is 8 m. Furthermore, the reaction temperature is 97° C. and the content of chromium in the polymer manufactured is 4 ppm.

At the end of this time, this first stage is complete and the second stage is begun; the flow rate for introduction of ethylene is then 1.12 t/h and the regulation system is modified so as to introduce the ethylene into the reactor with a constant flow rate. The ethylene flow rate is then increased by 225 kg/h every hour. The catalyst throughput is increased in parallel by 87 g/h. After 20 hours, this second stage is complete. The final total pressure is 1.95 MPa, the reaction temperature is 97° C., the fluidization rate is 52 cm/s and the height of the fluidized bed is 8 m. A polymer having the characteristics of the polymer powder employed in the initial fluidized bed is withdrawn with a throughput of 5.6 t/hour. This production throughput is then kept constant.

Throughout the start-up period, no formation of agglomerates and of fine particles is observed. Furthermore, the polymer quality is observed to be virtually constant.

What is claimed is:

1. A process for starting up a reaction for the polymerization of an olefin followed by a period for production of polymer in the gas phase carried out using a catalyst based on chromium oxide in a fluidized bed reactor through which moves a reaction gas mixture containing the olefin, comprising introducing olefin into the reactor during a start-up period of the reaction, which start-up period lasts until a substantially maximum level of production of polymer is reached, in a two-stage process, wherein during a first stage the introduction of the olefin is carried out so as to maintain a constant partial pressure of olefin in the reactor until the production rate of polymer has reached 5 to 30% of the substantially maximum level of production and during a second stage, which ends when the production of polymer is equal to the substantially maximum level of production, the introduction of the olefin is carried out in two or more successive phases in which the flow rate of the olefin introduced is increased sequentially in each successive phase and is kept constant during each phase.

2. The process of claim 1, wherein the start-up of the reaction lasts between 1 and 48 hours.

3. The process of claim 1, wherein the partial pressure of olefin is kept constant during the first stage using pressure regulation.

4. The process of claim 1, wherein the first stage lasts between 10 minutes and 3 hours.

5. The process of claim 1, wherein the production per unit volume of polymer at the end of the start-up is between 100 and 200 kg/m$^3$/h.

6. The process of claim 1, wherein the throughput for introduction of catalyst into the reactor during the second stage is increased in parallel with the increase in the flow rate for introduction of olefin.

7. The process of claim 1, wherein the catalyst is a refractory chromium oxide compound that has been activated by a heat treatment.

8. The process of claim 1, wherein the second stage includes from 5 to 40 successive phases.

9. A process for the polymerization of an olefin in the gas phase carried out using a catalyst based on chromium oxide in a fluidized bed reactor through which moves a reaction gas mixture containing the olefin, comprising first introducing olefin into the reactor during a start-up period of the reaction, which start-up period lasts until a substantially maximum level of production of polymer is reached, in a two-stage process, wherein during a first stage the introduction of the olefin is carried out so as to maintain a constant partial pressure of olefin in the reactor until the production rate of polymer has reached 5 to 30% of the substantially maximum level of production and during a second stage, which ends when the production of polymer is equal to the substantially maximum level of production, the introduction of the olefin is carried out in two or more successive phases in which the flow rate of the olefin introduced is increased sequentially in each successive phase and is kept constant during each phase and then introducing the olefin into the reactor during a production period of the reaction at which a substantially maximum level of polymer is produced.

10. The process of claim 9, wherein a comonomer is introduced into the reactor and at the end of the start-up period, the introduction of said comonomer is carried out so that the ratio of the flow rate of olefin to the flow rate of comonomer is kept constant during the polymerization.

11. The process of claim 1 or 9, wherein the olefin is ethylene, propylene, 1-butene, 1-hexene or 4-methyl-1-pentene.

* * * * *